United States Patent [19]

Teasel et al.

[11] Patent Number: 5,236,282
[45] Date of Patent: Aug. 17, 1993

[54] UNIVERSAL METHOD AND APPARATUS FOR TREATMENT OF POLLUTED SUBSTANCES

[75] Inventors: Thomas M. Teasel, Bloomfield Hills; William C. Teasel, Sterling Heights, both of Mich.

[73] Assignee: NFS Industries, Inc., Sterling Heights, Mich.

[21] Appl. No.: 807,699

[22] Filed: Dec. 16, 1991

[51] Int. Cl.$^5$ .............................................. B09B 3/00
[52] U.S. Cl. .................................. 405/128; 405/258; 432/14
[58] Field of Search ............... 405/128, 129, 258, 303; 175/66, 206; 166/248, 266, 267; 110/346; 134/21, 10; 432/13, 14, 134, 139

[56] References Cited

U.S. PATENT DOCUMENTS

| | | | |
|---|---|---|---|
| 4,019,327 | 4/1977 | Kempster | 405/266 X |
| 4,354,876 | 10/1982 | Webster | 405/266 X |
| 4,913,586 | 4/1990 | Gabbita | 405/129 |
| 4,927,293 | 5/1990 | Campbell | 405/128 |
| 5,039,415 | 8/1991 | Smith | 405/128 X |
| 5,109,933 | 5/1992 | Jackson | 405/128 X |

OTHER PUBLICATIONS

NFS Industries advertisement–A Trailer Mounted Portable Mixer.

*Primary Examiner*—Dennis L. Taylor
*Attorney, Agent, or Firm*—Marshall & Melhorn

[57] ABSTRACT

A method and apparatus for cleansing or restoring polluted substances such as soil or sludge has a horizontally mounted main conveyor which moves a polluted substance which is continually dispensed thereon from a main hopper. A pulverizer mounted proximate the main hopper breaks up the polluted substance into relatively small uniform particles before it is dispensed into the auger of moving means. Immediately downstream of the main hopper, in embodiments which require it, is a dry powder hopper for dispensing fly ash, lime, or other absorbent substance, depending on the process being used onto the polluted substance, or after, as it moves from a first to a second location. At the second location the substance is received by an auger apparatus operating in an elongated, angularly disposed, tubular mixing channel. As the contaminated substance and absorbent substance is moved through the auger apparatus, an oxidizing substance is applied thereto which by the nature of the auger is mixed into the absorbent and polluted substance to cause a reaction to take place and form reaction byproducts which are more environmentally acceptable. While this is taking place, a vacuum is simultaneously applied to the chamber to draw off the reaction byproducts and pass them through a cleansing or treating apparatus, preferably consisting of carbon drums, to cleanse and purify the air before it is returned to the atmosphere.

7 Claims, 5 Drawing Sheets

UNIVERSAL METHOD AND APPARATUS FOR TREATMENT OF POLLUTED SUBSTANCES

BACKGROUND OF THE INVENTION

1. Field of the Invention

The present invention relates to a method and apparatus for cleansing, rejuvenating, or restoring polluted substances. More specifically, the invention relates to a universal method and apparatus for cleansing, rejuvenating, or restoring contaminated or polluted substances such as contaminated soil, sand or sludge which may be produced by leaking gasoline or diesel fuel oil storage tanks, or by industrial processes. Whether the contaminated substance is such as soil found at an abandoned storage site, or sludge from an industrial operation, the contaminated substance must be restored to make the land upon which it was found, or the substance itself, suitable for some other use. Heretofore, the clean-up costs could easily be more than the market value of the item involved.

2. Description of the Prior Art

The need for clean-up of polluted soils, or the restoring of sludges produced by industrial processes and their conversion into useable materials, is a rather recent phenomenon. Heretofore, these operations have been very expensive and time consuming. One soil clean-up method known in the art has been to spread out the contaminated soil and mix it with an absorbent substance. The absorbent substance binds the heavy metals in the polluted soil. The mixture of polluted soil and absorbent is manually sprayed with hydrogen peroxide, and the soil is again mixed using suitable implements. The peroxide reacts with the remaining contaminant in the soil to form reaction by products which are more environmentally acceptable. However such manual method has proved to be extremely expensive, and only suitable for a single purpose. Therefore, those in the art sought a better solution to the problem.

One such method and apparatus is such as described in U.S. Pat. No. 4,927,293 issued on May 22, 1990 to Randy P. Campbell. This method and apparatus involved placing the contaminated soil on a conveyor, applying an absorbent to the soil, receiving the contaminated soil and the absorbent materials at a transfer location, and concurrently mixing the materials together and transporting them from a transfer location to a deposit location while applying an oxidizing material to produce a reaction having more acceptable by-products. To enhance the reaction, air under pressure was introduced as the material was being mixed and transported to speed up the reaction. The exhaust air was then passed through collectors to capture any volatile, gaseous, reaction products.

However, this method and apparatus, although mechanized, proved to be rather slow. It was still only a single purpose apparatus, and was usable only with one particular treatment process. Also, it was found that the introduction of air under pressure intensified the oxidizing reaction to such an extent that sometimes dangerous conditions could prevail in the apparatus. In addition, since the power supplied to drive the aerator was in no way connected to the hydraulic system used to operate the remainder of the system, on at least one occasion when the blower was shut down, air continued to be injected, and an explosion resulted because the reaction by products built up.

Thus, the aforementioned method and apparatus, while being somewhat satisfactory, still did not solve the problems present in the soil treatment art, presented safety problems, and was still a single purpose device. Therefore, those skilled in the art, including Applicants, continued work toward finding a better solution.

Applicants undertook a careful study of the problems present in the soil treatment art, including a study of the aforementioned process, with a view to developing a method which would not only be suitable for soil treatment, but could also treat contaminated items or polluted substances such as desert sands and industrial sludges. In addition to developing such a multi-purpose method and apparatus, applicants were determined to develop a faster and more economical method and apparatus than was heretofore available. Applicants, after careful study of the problem, were able to adapt a portable mixer of their manufacture, called the MOBIL-CRETER ™, manufactured by them for 17 years, to the treatment of polluted substances. The MOBIL-CRETER was particularly adaptable because it had an inclined auger which applicants found enabled them to speed up the oxidation process of the previous apparatus. Because the mixing and conveying apparatus previously described operated in a horizontal plane, the soil would quickly travel from one end to the other end of the mixing and conveying apparatus and the mixing and conveying device had to be run very slowly for the oxidizing process described in U.S. Pat. No. 4,927,293 to sufficiently take place to cleanse the soil.

By using the well-known properties of an auger, and using the inclined auger of their previous apparatus, Applicants were able to process much more dirt by in effect lengthening the path of travel which the dirt or polluted substance took after being sprayed with the oxidizing material. Only after travelling several times to near the top of the auger, and then falling back because of the soil being of too large a particle size, would the soil eventually be broken down into small enough particles to travel completely to the top of the auger and be discharged at the output. However, this method and apparatus known in the art still had serious limitations. By the time such apparatus was developed, several proprietary processes were developed by chemical manufacturers. Yet, no one method and apparatus could be used with all the proprietary processes. In addition, the apparatus was still only a soil treatment apparatus, and could not treat other polluted substances such as industrial waste. As a result, a need still existed to provide for a universal method and apparatus for treatment of all types of polluted substances in a speedy and improved manner.

SUMMARY OF THE INVENTION

In accordance with the present invention, there is provided a method and apparatus for treatment of polluted substances which adds several significant features not found in the prior art, and which is able to work with all known proprietary soil treatment processes as well as work with polluted substances such as industrial sludge. The present method and apparatus adds to the method and apparatus known in the prior art the necessary apparatus to pulverize the polluted substance being treated before an absorbent, if needed, is applied to the polluted substance.

In addition, to avoid the potential explosion problem of the prior art method and apparatus, the present method and apparatus does not supply air under pressure to the mixture of the absorbent and polluted substances but, instead, depends on the longer travel path provided by the inclined auger to speed up the process and provides a positive step to cleanse the reaction by-products by applying a vacuum in the auger or oxidation chamber and then passing the output of the vacuum pump or blower used to apply the vacuum through charcoal canisters to cleanse the reaction by-products before returning the air to atmosphere. One or more dry powder hoppers is provided, each of which may have an auger-like feed mechanism allowing them to be used with all types of dry powders such as lime and fly ash, as well as concrete, and thus enable the apparatus to be used with all known proprietary processes requiring application of an absorbent material or an encapsulating material.

In a first embodiment of the method of the present invention, there is provided a method in which a polluted substance is first pulverized, an absorbent material is applied to the polluted substance, the polluted and absorbent substances are mixed, an oxidizing substance is applied to the mixture of polluted and absorbent substances to produce a reaction having by-products which are environmentally acceptable, a vacuum is applied to the mixture of oxidizing, polluted, and absorbent substances to draw off the reaction by-products. The reaction by-products are then cleansed, treated or scrubbed before they are returned to atmosphere.

In a second embodiment of the method of the present invention, a method is disclosed including the steps of receiving and holding a quantity of polluted substance to be cleansed or restored, vibrating said polluted substance while holding the same, dispensing said polluted substance in a continuous flow, moving said polluted substance from a first location to a second location, applying an absorbent substance to said polluted substance while moving said polluted substance between said first and said second locations, mixing said polluted and absorbent materials while moving them between said second and a third location, applying an oxidizing material to said mixture simultaneously with moving said mixture between said second and said third locations to produce a reaction having reaction by-products more environmentally acceptable, drawing off or vacuumizing said by-products with a vacuum, and cleansing or treating said by-products before releasing them to atmosphere.

In a third embodiment of the method of the present invention, a method is provided having the steps of receiving and holding a quantity of polluted substance to be cleaned, vibrating said substance while holding the same, pulverizing said polluted substance into very small particles, dispensing said polluted substance in a continuous flow, moving said substance from a first location to a second location, applying an oxidizing material to said polluted substance while moving said polluted substance from said first to said second location, drawing off said reaction by-products with a vacuum, and cleansing said reaction by-products before releasing said reaction by-products to the atmosphere.

In yet another embodiment of the method of the present invention, there is provided a method in which a polluted substance is first pulverized, a cold cracking material is applied to the polluted substance, the polluted and cold cracking substances are mixed, a vacuum is applied to the mixture of the cold cracking and polluted substances to draw off the reaction by-products, and the reaction by-products are then cleansed, treated or scrubbed before they are returned to the atmosphere.

In still another embodiment of the method of the present invention, a method is provided in which a polluted substance is first pulverized, lime is applied to the polluted substance, the polluted substance and lime are mixed, and the combination of the polluted substance and lime are then dried before reuse. In another embodiment of the present invention, there is provided method in which a polluted industrial by-product is first pulverized, a first absorbent material such as lime is applied to the polluted substance, a second material such as cement is applied to the polluted substance, the polluted substance, lime, and cement are mixed, water is applied to the mixture of the absorbent substance, the polluted substance and the cement to produce a reaction having by products which are environmentally acceptable, a vacuum is applied to the mixture of polluted substance, lime, concrete and water to draw off the reaction by-products. The reaction by-products are cleansed and released to the atmosphere and the mixture of polluted substance, lime, concrete and water is formed into blocks for further use.

In a first embodiment of the apparatus of the present invention, an apparatus is disclosed which provides means for moving a polluted substance from a first location to a second location, means for pulverizing said polluted substance, means for dispensing an absorbent substance on said contaminated substance, means for receiving said contaminated and absorbent substances downstream of said second location and for simultaneously mixing said substances together and transporting them from said second location to a third location, means for applying an oxidizing material to said polluted and absorbent substances between said second and said third locations to produce a mixing of said oxidizing material therewith between said second and said third locations and thereby produce a reaction having reaction by-products more environmentally favorable, and means for applying vacuum to said polluted, absorbent, and oxidizing substances.

In a further embodiment of the apparatus of the present invention, an apparatus is disclosed which has means to continuously move a contaminated substance from a first location to a second location, hopper means mounted on said frame above said moving means for holding a load of said contaminated substance and dispensing said contaminated substance in a continuous flow at said second location, means to pulverize said contaminated substance mounted proximate said hopper means and said moving means to reduce said contaminated substance to very small particles, powder hopper means for holding a load of absorbent substance and dispensing said absorbent substance in a continuous flow, mixing and transporting means mounted on said frame for receiving said contaminated and absorbent substances at said second location and for simultaneously mixing said substances together and transporting them to a third location, application means mounted on said frame for applying an oxidizing material to said contaminated and absorbent substances between said first and said second locations to produce a mixing of said oxidizing substance with said contaminated and absorbent substances as the latter are mixed together and moved from said second to said third location, thereby producing a reaction having reaction by-products which are environmentally acceptable, and vacuumizing means or means for applying a vacuum to said polluted absorbent and oxidizing substances at a plurality of locations between said second and said third locations simultaneously as the oxidizing substance is applied thereto and the contaminated absorbent and oxidizing substances are mixed together and moved from said second to said third location to remove said reaction by-products, and means to cleanse said reaction by-products before they are released in the atmosphere.

In yet another embodiment of the apparatus of the present invention, apparatus is disclosed having means for moving a polluted substance from a first location to a second location, means for pulverizing said polluted substance downstream from said second location and reducing said polluted substance to very small particles, means for applying an absorbent to said polluted substance, means for applying an oxidizing material to said polluted and absorbent substances downstream said second location, means for applying vacuum to said polluted and oxidizing substances as said oxidizing substance is being applied to draw off said reaction by-products and means to cleanse said reaction by-products before they are released to atmosphere.

In still another embodiment of the apparatus of the present invention, there is disclosed apparatus having means for moving a polluted substance from a first location to a second location, means for pulverizing said polluted substance downstream from said second location and reducing said polluted substance to very small particles, means for applying a suitable substance to cause a "cold cracking" process to take place in which volatiles are encapsulated so as not to be explosive, means for applying vacuum to said polluted and cold cracking substances to draw off reaction by-products, and means to cleanse said reaction by-products before they are released to atmosphere.

In another embodiment of the apparatus of the present invention, apparatus is disclosed having means for moving a polluted substance from a first location to a second location, means for pulverizing said polluted substance downstream from said second location and reducing said polluted substance to very small particles, means for applying an absorbent substance to said polluted substance, means for applying a water spray to said polluted and absorbent substances downstream of said second location, and means for drying said combination of said polluted and absorbent substances and water.

In yet a further embodiment of the apparatus of the present invention, apparatus is disclosed having means for moving a polluted substance from a first location to a second location, means for pulverizing said polluted substance downstream from said second location and reducing said polluted substance to very small particles, means for applying an absorbent substance to said polluted substance, means for applying concrete to the combination of said polluted substance and said absorbent substance, means for spraying water on said combination of said absorbent and polluted substances and water and means for further processing the combination of lime, cement and polluted substance into a usable product.

Therefore, it is an object of the present invention to provide a universal method and apparatus for treating polluted substances which can cleanse contaminated soil and sand as well as industrial substances such as sludge.

Another object of the present invention is to provide a faster and more efficient means of soil treatment than is heretofore been available.

A still further object of the present invention is to provide an apparatus for treatment of polluted substances having suitable safety features such that the apparatus cannot run unless vacuum is being applied to the polluted substance as the oxidizing substance is being applied.

A further object of the present invention is to eliminate the need for aerating the polluted, absorbent, and oxidized substances.

A still further object of the present invention is to provide a more economical and more efficient soil treatment apparatus.

Further objects and advantages of this invention will be apparent from the following description and appended claims, reference being had to the accompanying drawings forming a part of the specification, wherein like reference characters designate corresponding parts in the several views.

It is to be understood that the present invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description, and not of limitation.

DETAILED DESCRIPTION OF THE PREFERRED EMBODIMENTS

Figure 1:
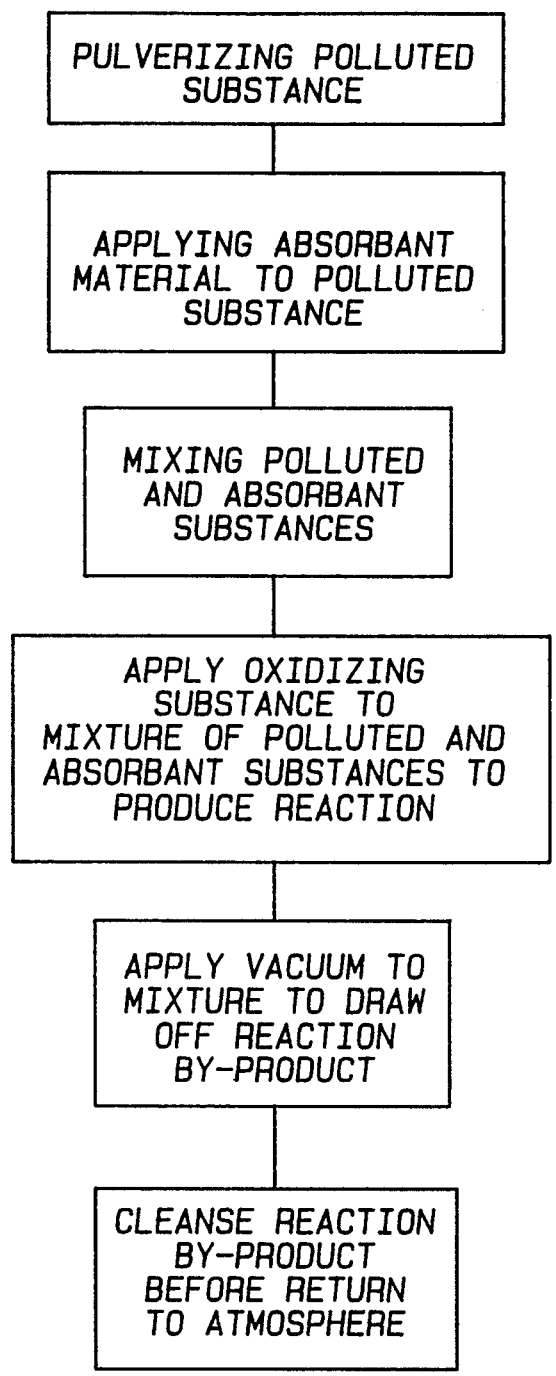
FIG. 1 is a flow chart showing a sequence of steps utilized in the method of the present invention.

Referring now to FIG. 1, there are shown the basic steps involved in the method of the present invention. Whether the method is being used in a conventional manner for the treatment of soil contaminated by fuel oil or gasoline spills, is being used for more exotic uses such as the treatment of oil contaminated desert sand, or is being used for the treatment of industrial sludge or other waste, it is important that the polluted substance be pulverized into very small particles to speed up the chemical reactions which may take place. Such pulverizing step was not known in the prior art and is one of the major reasons for the slowness of prior art processes. After pulverizing the polluted substance (box 200), if the treatment process being used requires it, an absorbent material is applied to the polluted substance (box 210). The present apparatus is usable with all known present day processes, even though in some instances the absorbent material or the oxidizing material being applied has not been made known to the inventors. The universal nature of the method and apparatus will be explained further herein below.

After applying the absorbent material to the polluted substance, if needed, the polluted and absorbent substances are mixed together (box 220). It is believed that the mixing of the polluted and absorbent substances after the applying of the absorbent substance helps the absorbent substance bond to the heavy metals in the polluted substance being treated. After the polluted and absorbent substances are mixed, an oxidizing substance is applied to the mixture to produce a chemical reaction which will have by-products which are environmentally acceptable.

In contrast to certain prior art apparatus which injects air under pressure into the mixture of the polluted and absorbent substances, and which under certain conditions can produce explosive situations, the pulverizing of the polluted substance increases the surface area available for the chemical reaction and eliminates the need for the aeration.

Instead, after the oxidizing substance is applied (box 230), a vacuum is applied to the mixture (box 240) to draw off the reaction by-product. After the reaction by-product is drawn off, it is cleansed (box 250) before it is returned to atmosphere.

In one process just coming to market for the treatment of polluted substances, the step of applying absorbent material to the polluted substance is not needed. Instead a proprietary cold cracking substance which must be applied under pressure is used, and this material is believed by the inventors to encapsulate volatiles in the soil so the mixture is not so explosive. In this case, step 210 would be eliminated, but because of the explosive nature of the product step 240 would still be needed.

In another process known in the art as "Solomon" process, the absorbent material would be lime, and instead of applying the oxidizing substance as in step 230, water would be applied at this point in the process by means of a spray, and the mixture would then be placed back down on the earth to dry. When the method of the present invention is used to practice the Solomon process, there is no need to apply the vacuum (step 240) or cleanse the reaction by-products (step 250).

In the processing of certain industrial wastes it is necessary to apply two substances (two-step process) to the polluted substance in addition to the water spray. In this case, the polluted substance would be pulverized (box 220). A first material, such as an absorbent material which may be lime, is applied to the polluted substance (step 210).

Concrete is then also applied to the combination of the polluted substance and lime before the mixing step. Again, instead of an oxidizing substance, water is sprayed on instead of peroxide.

Figure 2:
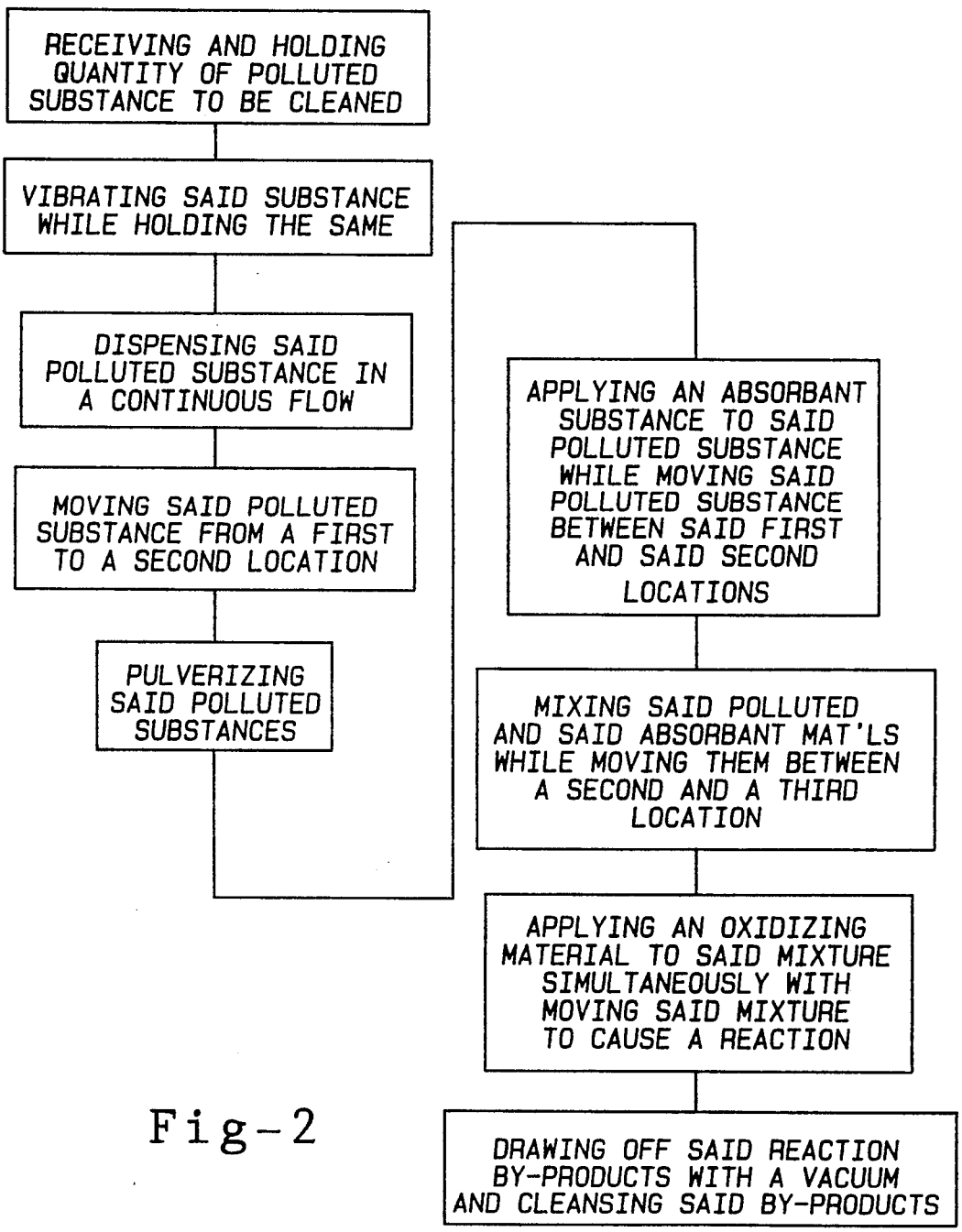
FIG. 2 is a flow chart showing a sequence of steps used by in a modification of the method embodied in the present invention.

Referring now to FIG. 2, there is shown a flow chart representing another embodiment of the method of the present invention. In this embodiment of the present invention, a quantity of the polluted substance to be cleansed or restored is first held in suitable means such as a hopper means (box 260). A vibrator is used to vibrate the polluted substance (box 270) while the same is being held in the hopper to improve the dispensing of the same from the hopper. Suitable means are then provided to dispense the polluted substance from the hopper in a continuous flow (box 280).

Moving means are then provided to move the polluted substance from a first or receiving location to a second or transfer location (box 290). The polluted substance is then pulverized (box 300).

At the second location, the absorbent and polluted substances are transferred to a moving and mixing means and the polluted and absorbent materials are mixed while moving between said second location and a third location (box 320). While the polluted and absorbent materials are moving between the second and third location, an oxidizing material is applied simultaneously with the moving and mixing to cause a reaction (box 330) having reaction by-products more friendly to the environment. While the reaction is taking place, the reaction by-products are being drawn off by a vacuum, and the by-products are being cleansed (box 340) before they are released to the atmosphere.

The embodiment of the method of the present invention just described in connection with FIG. 2 can also be used with the "cold cracking", "Solomon" and "two step" processes just described.

Figure 3:
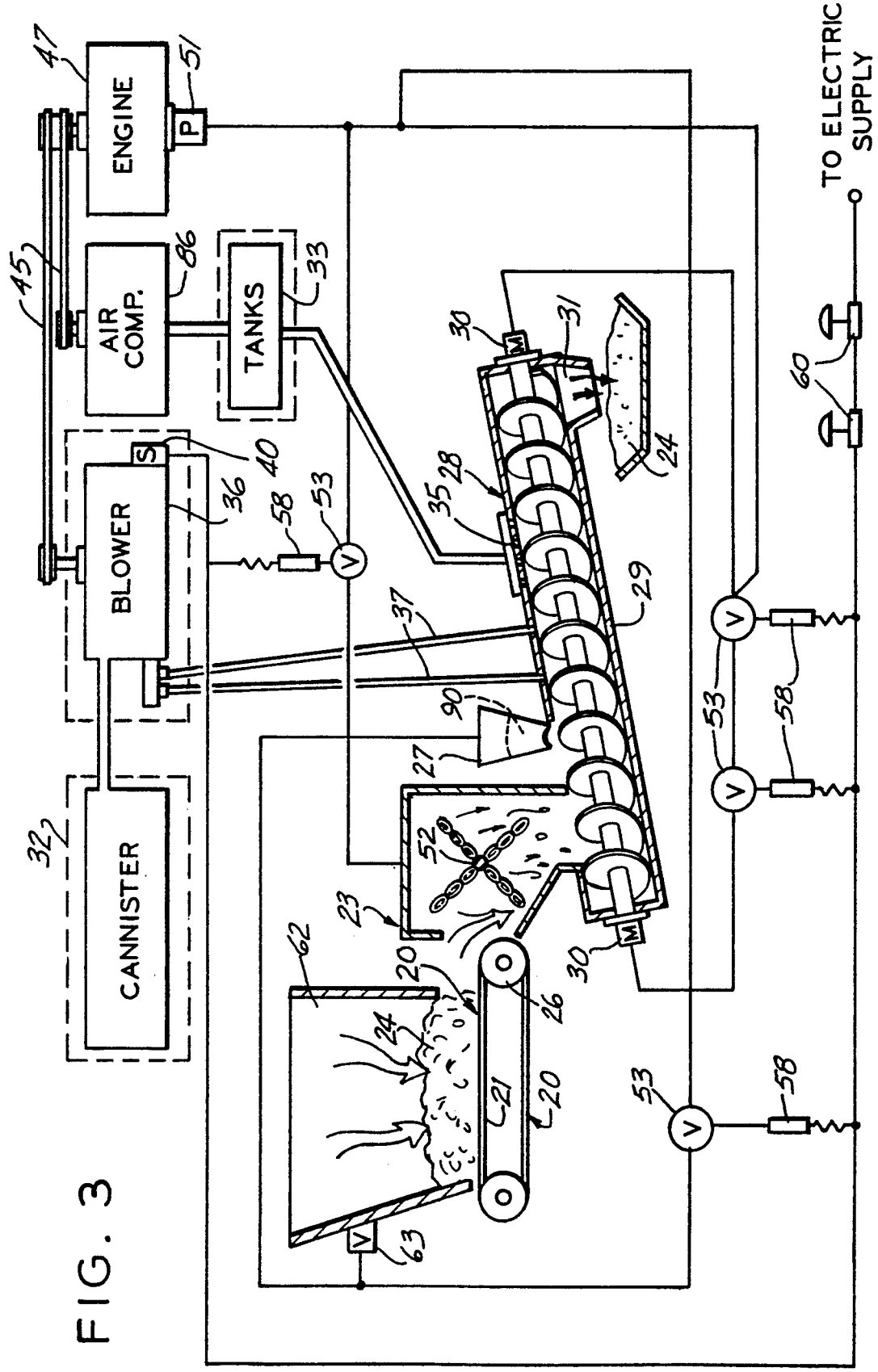
FIG. 3 is a diagramatic view of a construction embodying the present invention.

Referring now to FIG. 3, a diagramatic view of an apparatus which may be used to perform the methods shown in FIGS. 1 and 2 is shown. A means for moving a polluted substance from a first location to a second location is generally designated by the numeral 20. Such means for moving may take any practical form, such as the conveyor 21, which may be operated by means well known in the art. The means to move may also be other types of conveyors, or other entirely different devices, such as single or double augers. The conveyors, augers or other means to move may be manually powered or powered by any suitable means such as hydraulic, electric or gasoline motors or engines. A means to pulverize, generally designated by the numeral 23, is preferably provided downstream of the second location, and will be described hereinafter in greater detail. A quantity of contaminated or polluted substance 24 is passed through the means to pulverize 23 and then into auger 29, described below.

The means for moving 20 moves the pulverized material 24 from a first position at or near the beginning of belt conveyor 21, indicated by numeral 25, to a position at or near the end of the belt conveyor 21 indicated by the numeral 26. At or near the second or transfer location 26, in addition to the means to pulverize 23, a means for dispensing an absorbent substance 90 on the contaminated substance is provided, and is generally indicated by the numeral 27. More than one such means may be provided, if needed. At the transfer location, preferably simultaneously with the application of the absorbent material or dry powder, the absorbent substance and the polluted substance enter a means for receiving and transporting, generally indicated by the numeral 28, which may be such as the auger 29 powered by the first hydraulic motor 22 and second hydraulic motor 30.

The auger effectively lengthens the travel path of the mixture of the absorbent and polluted substances by only letting the lightest and finest particles out the discharge end 31 of the auger 29. While the combination of the absorbent and polluted substances are being moved on an incline up the auger 29, a means for applying an oxidizing or wetting substance (32) to the combination of the polluted and absorbent substances is applying an oxidizing material such as hydrogen peroxide. As previously described, the means for applying an oxidizing or wetting substance 32 may be used to spray water, such as when used with the Solomon process, or the "two-step" process just described, or may be used to apply a cold cracking substance when a cold cracking process is used. The remainder of the description of FIG. 3, for ease of understanding, will assume that a process is being described which needs an oxidizing substance applied.

As previously discussed, with certain processes, one known process being the "Solomon" process wherein the lime and water are mixed with the polluted substance and placed back on the ground to dry, the step of applying a vacuum and cleansing the reaction by-products is not needed. The same can be said for the "two-step" process which is used to manufacture certain "red earth" into reusable building products such as brick wherein lime and cement are applied to the polluted substance, a small amount of water is sprayed thereon as the substances are being mixed and the combination formed thus far is formed into bricks or other shapes for reuse.

The means to apply, generally designated by the numeral 32 may include a tank or reservoir 33 connected by a suitable conduit to a pump or third hydraulic motor 34. The outlet of third hydraulic motor 34 is in fluid communication with spray nozzles 35 placed interiorly of the auger 29.

The application of the oxidizing substance to the absorbent and polluted substances causes a chemical reaction to take place which, depending on the particular materials used by the process involved, will produce certain reaction by-products which are more environmentally acceptable than the polluted substance. These reaction by-products will fill the interior of the auger 29 and would pollute the atmosphere unless a mild vacuum were applied to the interior therein by a means to apply vacuum such as vacuum pump or blower 36 which is in fluid communication with the interior of the auger 29 through suitable conduit 37. To cleanse or purify the reaction by-products and thereby make them suitable for release back into the atmosphere, the outlet 38 of the blower 36 is connected by conduit 39 to canister 40 to form a means to cleanse or purify. The canister 40 may have various cleansing or purifying agents therein depending on the particular reaction by-products being produced. The particular reaction by-products produced are sometimes not known by the inventors because of the proprietary nature of some of the chemicals with which their machines are used. Therefore, the particular contents of the canister cannot be known or specified for some of the processes which Applicant's apparatus may be used. However, in one known process, the application of a calcium material as the absorbent material and hydrogen peroxide as the oxidizing material requires that activated chaccoal be placed in the canister 40. The outlet 41 of the canister 40 allows the purified reaction by-products to re-enter the atmosphere.

Several safety features are present on the apparatus of the present invention which are heretofore unknown in the art, and which solve the safety problems present in prior art devices. It can be seen that the blower 36 is driven by belt 45, driven by pulley 46 connected to the output shaft of motor 47. The motor 47 may be any type of motor or engine such as an electric motor, a gasoline engine or a diesel engine. Since it is preferred that the apparatus of the invention be portable and be movable from job site to job site, it is preferred that the motor 47 be a prime mover such as a gasoline or diesel engine. By having the blower 37 and/or air compressor 86 belt driven by the belts 45, if the motor stops, it is known that the blower and/or air compressor will stop functioning. A sail switch 49, used as part of a safety circuit to be hereinafter described, would cause the entire system to shut down if belt 45 broke and the blower was not running.

Since the motor 47 drives the hydraulic pump 51 by belt or other means, a stopping of the motor would simultaneously stop the operation of the means to pulverize 23, the means to move 20, the means to apply the oxidizing and/or wetting material 32, and the means for mixing and moving 28 without requiring any action on the part of the operator. The hydraulic pump 51 supplies hydraulic fluid to the first hydraulic motor 22, the second hydraulic motor 30, the third hydraulic motor 34, (See FIG. 4A) and the fourth hydraulic motor 52 (See FIG. 7) through preferably, but not necessarily, identical valves 53. Each of the valves 53 is in turn operated by a solenoid 58 well known in the art. The solenoids 58 are all connected in parallel with a common lead connected to the output of sail switch 49. Sail switch 49 is normally a closed switch when air flows past it. Upon air flow ceasing, the sail switch 49 will become open and stop the flow of current to the solenoids 58, causing the solenoids 58 to close all the valves 53 and stop operation of the entire system. This prevents any dangerous buildup of fumes from occurring. The sail switch 49 is placed in series with one or more safety switches 60 placed in a desired position for operation by the operator should an emergency occur. The safety switch 60 is, in turn, connected to an electric supply which preferably is from a generator operated by the motor 47, so that the apparatus may be entirely self contained.

Preferably, the apparatus will include a hopper means 62 for holding a supply of the polluted substance which is to be cleansed, rejuvenated or restored. To aid in dispensing the polluted substance, a means to vibrate 63 may be attached to the hopper means 62. Thus, in operation, a supply of the polluted substance 24 is loaded into the hopper means 62 where the means to vibrate 63 causes a vibration to aid in dispensing the polluted substance and delivering it to the means to pulverize 23. The means to pulverize breaks the polluted substance 24 into very fine particles and delivers it proximate to a second or transfer location 26. A means to apply an absorbent material applies an absorbent material to the polluted material 24 just before the polluted material enters the auger 29 through inlet 29A. The auger or means to mix and move 28 mixes the absorbent material and the polluted material while the means to apply the oxidizing substance 32 applies a preferred substance to the mixture before it is discharged out the outlet 31 of the auger 29. The reaction by-products which are a result of this operation move through the conduit 37 through the outlet 38 of the blower 36 into the conduit 39 and move through the canister 40 and are discharged to atmosphere through outlet 41.

Figure 6:
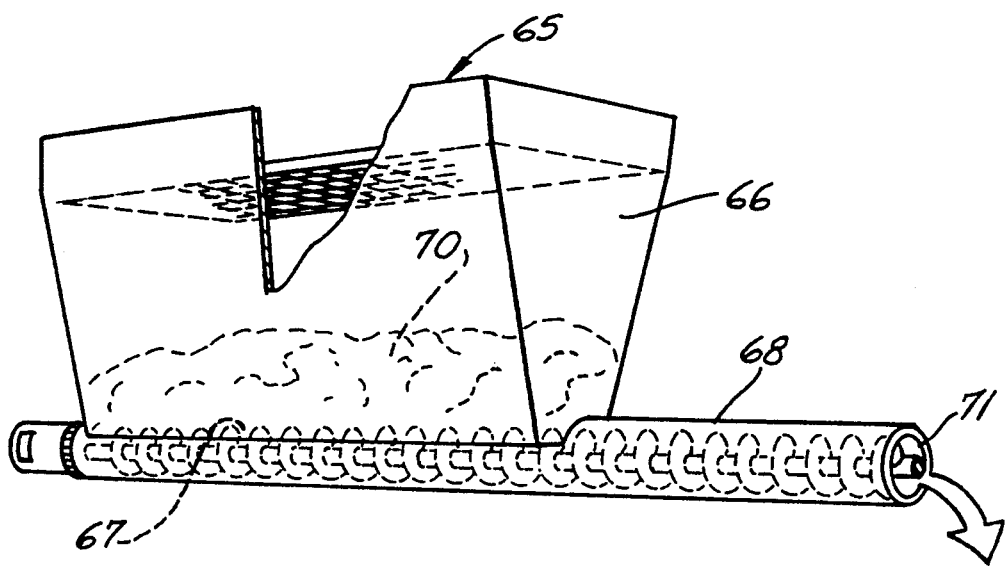
FIG. 6 is a diagramatic view of the dry powder hopper shown in FIGS. 3-5.

Referring now to FIG. 6, there is shown a preferred embodiment of the means to apply the absorbent and/or other materials in the form of hopper means generally designated by the numeral 65. One or more hopper means, depending on the process, may be provided. Also, the hopper means 65 will not be required in some of the proprietary processes now coming on the market, but it is still foreseen that it will be needed for some time to come, and that it will need to accept a variety of materials such as fly ash and calcium based materials such as lime or other powder type materials. The hopper means 65 includes dry powder hopper 66 having longitudinal outlet 67 dispensing powder into the interior of auger 68 operated by a drive means such as an electric or hydraulic motor 69. The dry powder or absorbent material 70 is discharged through adjustable outlet 67 onto the end of the means to move 20, such as conveyor 21.

Figure 7:
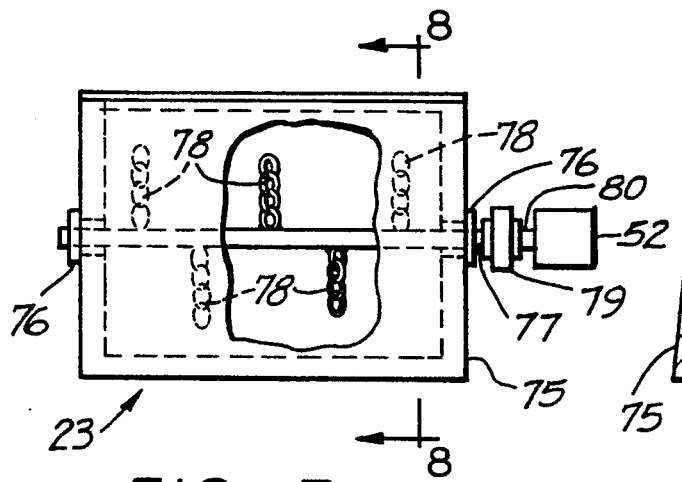
FIG. 7 is a pictorial elevational view of the means to pulverize used in the present invention.
Figure 8:
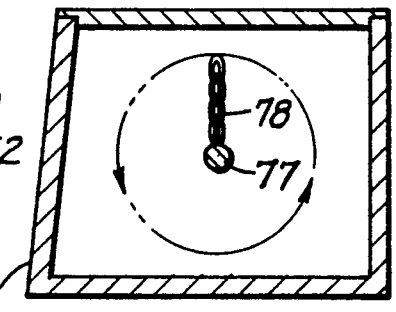
FIG. 8 is an end view of the construction shown in FIG. 7.
Figure 9:
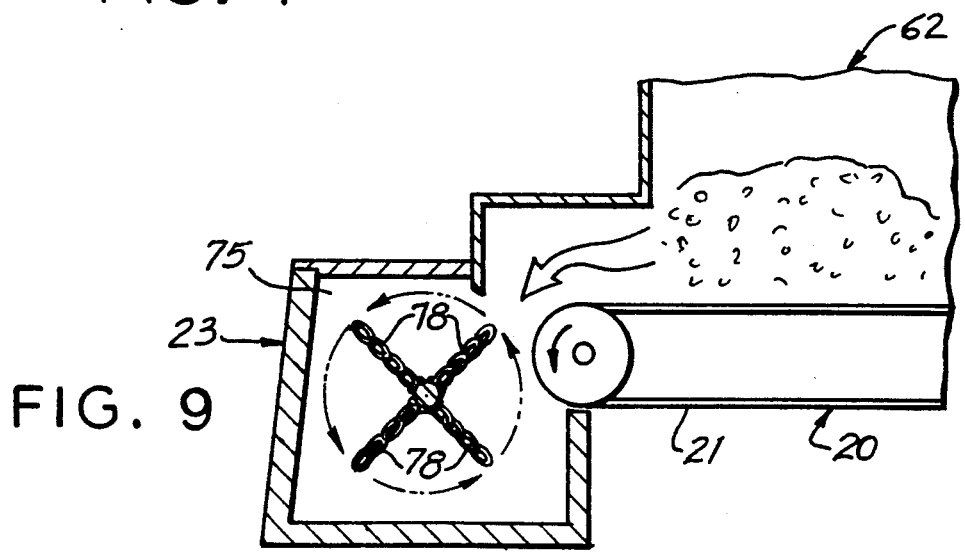
FIG. 9 is a pictorial view of the soil hopper pulverizer and conveyor utilized in the construction of the present invention.

Referring now to FIGS. 7-9, the most preferred embodiment of the means to pulverize 23 is shown. A generally rectangular housing 75, screened at the top thereof, and adjustably openable at the bottom, is provided, to which is journaled, by suitable bearings 76, a shaft 77. To the shaft 77 are attached, such as by bolts or other suitable means, lengths of chain 78 which, when the shaft 77 is rotated, extend in a radial direction due to centrifical force. The shaft 77 is coupled by coupling 79 to shaft 80 of the fourth hydraulic motor 52 which receives hydraulic pressure from the hydraulic pump 51. It should be understood that many other pulverizing means well known in the art may also be used, and be well within the scope of the present invention. FIG. 9 shows the preferred arrangement of the hopper means 62, the means to move 20 and the means to pulverize 23.

Figure 4:
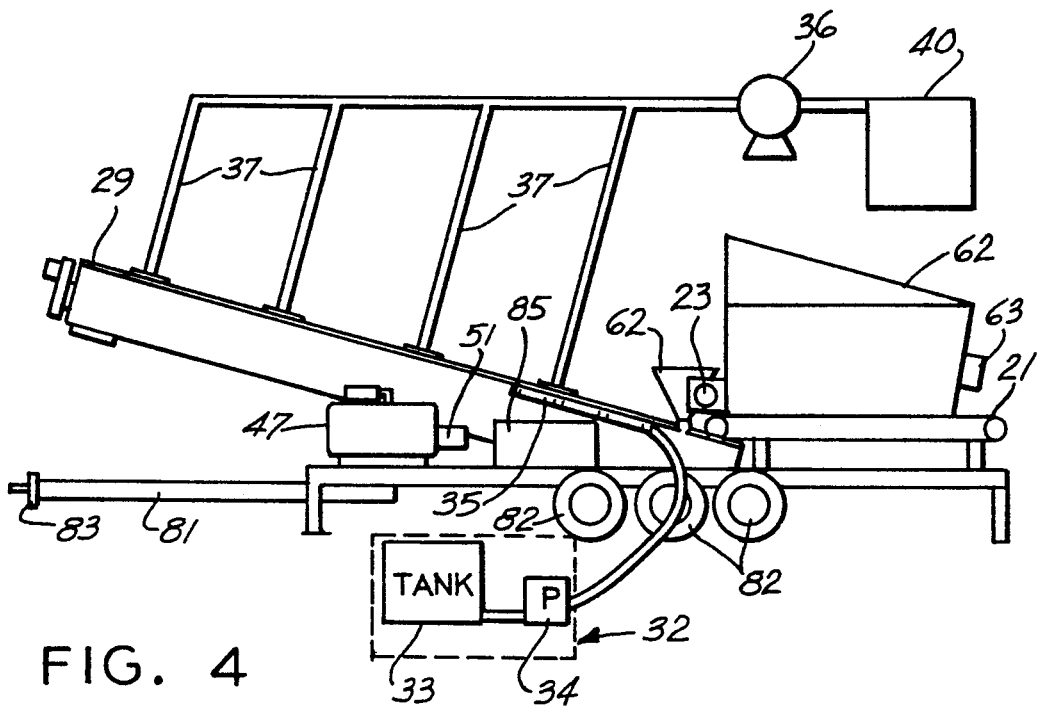
FIG. 4 is an elevational view of a construction embodying the present invention.
Figure 5:
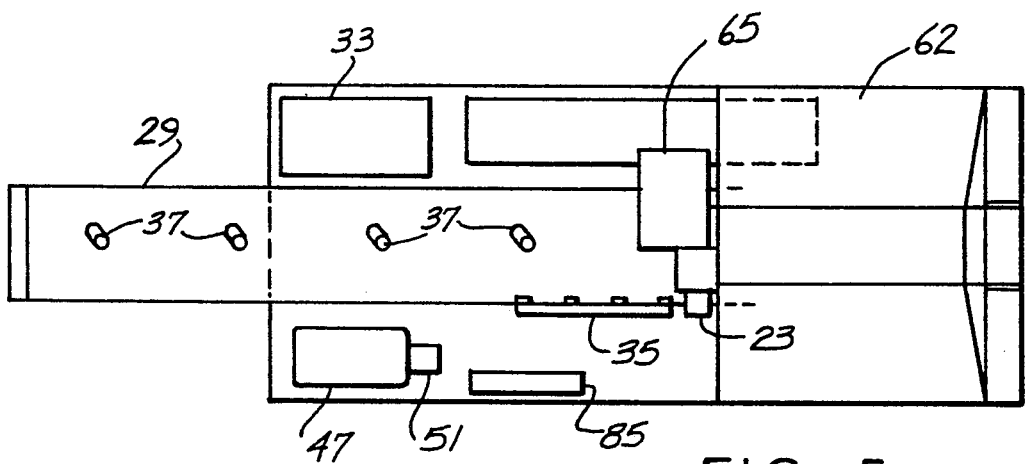
FIG. 5 is a top plan view of the construction shown in FIG. 4.
Figure 4A:
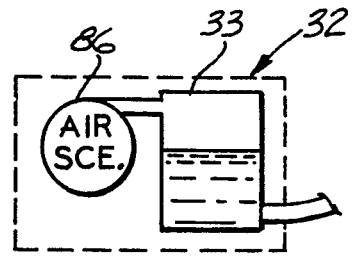
FIG. 4a is a modification of the means to apply an oxidizing or wetting substance shown in FIG. 4.

Referring now to FIGS. 4 and 5, the most preferred embodiment of the present invention is shown. A frame member 81 is supported by suitable wheel and axle assemblies 82 and may have a removable tongue 83. Mounted to the frame 81 is a suitable engine or motor 47 connected to the hydraulic pump 51. A suitable electric control panel 85 is provided on which the safety switches, solenoid valves, etc. previously discussed may be mounted. The auger 29 may be provided downstream of one or more dry powder hopper or hopper means 62, provided adjacent the means to pulverize 23.

In fluid communication with the interior of the auger 29, if needed, are conduits 37 connected to blower 36 which in turn is connected to canister 40. The means to apply the oxidizing and/or wetting substance 32 is connected by suitable conduit to spray nozzles 35 and includes a tank or reservoir 33 containing the oxidizing substance in fluid communication with third hydraulic pump 34.

In some of the newer proprietary processes, the hopper means 62 may be eliminated, and in this case movement of the contaminated substance may be referred to as having taken place between a first location located anywhere on conveyor 21 and a second location located at or near the end of the auger 29. In these "cold-cracking" processes the proprietary liquid being used is believed to be so corrosive that it cannot be pumped so that the tank or reservoir 33 must be placed under pressure by an air compressor 86 to propel the liquid through the spray nozzles 35.

In others of the newer proprietary processes, such as the Solomon process, the means to apply vacuum, such as the blower 38, and the means to cleanse, such as the canister 40 may not be needed, and the means to apply the oxidizing or wetting substance will apply water to a mixture of polluted substance and lime.

In another process, wherein a contaminated "red earth" is treated in a "two-step" process, two hopper means 62 are provided, one of which applies lime to the polluted substance, and the other of which applies a substance such as cement to the polluted substance, after which the combination is introduced into the auger and again the means to apply the oxidizing or wetting substance is used to apply water to the mixture, which then may be shaped into usable forms.

Thus, by careful consideration of the problems existing in the prior art, a new and novel method and apparatus for the treatment of polluted substances has been provided.

We claim:

1. An apparatus for restoring contaminated substances comprising:
   (a) an elongated frame member,
   (b) means mounted on said frame member for continuously moving a contaminated substance from a first location to a second location,
   (c) hopper means mounted on said frame above said moving means for holding a load of said contaminated substance and dispensing said contaminated substance in a continuous flow proximate said second location,
   (d) pulverizing means mounted proximate said hopper means and said moving means to reduce said contaminated substance to very small particles,
   (e) mixing and transporting means mounted on said frame for receiving said contaminated and absorbent substances at said second location and for simultaneously mixing said substances together and transporting them to said third location,
   (f) application means mounted on said frame for applying an oxidizing substance to said contaminated and absorbent substances between said second and said third locations to produce a mixing of said oxidizing substance with said contaminated and absorbent substances as the latter are mixed together and moved from said second to said third location to produce a chemical reaction, and
   (g) vacuumizing means on said frame for applying a vacuum to said contaminated absorbent and oxidizing substances at a plurality of locations between said second and said third locations simultaneously as the oxidizing substance is applied thereto and the contaminated absorbent and oxidizing substances are mixed together and moved from said second to said third location.

2. The apparatus defined in claim 1, and further including:
   (a) cleansing means mounted on said frame and in communication with said mixing and moving means for collecting any reaction byproducts to prevent release thereof to the atmosphere.

3. The apparatus defined in claim 2, wherein said moving and mixing means includes an angularly mounted elongated tubular mixing chamber and including a mixing and conveying auger rotatably mounted therein.

4. The apparatus defined in claim 3, wherein said cleansing means includes at least one carbon drum connected in fluid communication with a vacuum pump for receiving said volatile reaction byproducts from said mixing chamber.

5. The apparatus defined in claim 4, wherein said vacuum pump includes a blower operable only when power is supplied to the rest of said apparatus for restoring.

6. The apparatus defined in claim 3, wherein said polluted substance holding and dispensing means includes:

(a) a main hopper disposed above said moving means, and (b) a dry powder hopper disposed proximate said main hopper and above said moving means.

7. The apparatus defined in claim 3, wherein said moving means includes a horizontally mounted belt conveyor.

* * * * *